(12) United States Patent
Parker et al.

(10) Patent No.: US 6,996,782 B2
(45) Date of Patent: Feb. 7, 2006

(54) USING DIGITAL OBJECTS ORGANIZED ACCORDING TO A HISTOGRAM TIMELINE

(75) Inventors: Martin A. Parker, Rochester, NY (US); John K. McBride, Rochester, NY (US); Alexander C. Loui, Penfield, NY (US)

(73) Assignee: Eastman Kodak Company, Rochester, NY (US)

( * ) Notice: Subject to any disclaimer, the term of this patent is extended or adjusted under 35 U.S.C. 154(b) by 703 days.

(21) Appl. No.: 09/863,856

(22) Filed: May 23, 2001

(65) Prior Publication Data

US 2003/0009493 A1    Jan. 9, 2003

(51) Int. Cl.
*G06F 13/00* (2006.01)
(52) U.S. Cl. .................. 715/764; 715/838
(58) Field of Classification Search ............ 345/764, 345/804, 776, 835; 715/764, 723, 838, 840; 707/1, 5, 104.1
See application file for complete search history.

(56) References Cited

U.S. PATENT DOCUMENTS 6,204,840 B1 *  3/2001  Petelycky et al. ....... 715/500.1
6,301,586 B1 * 10/2001  Yang et al. ............. 707/104.1

* cited by examiner

*Primary Examiner*—Cao (Kevin) Nguyen
(74) *Attorney, Agent, or Firm*—Raymond L. Owens (57) ABSTRACT

A method for organizing visual digital objects and for selecting one or more of such visual digital objects for viewing includes developing a histogram timeline which identifies a number of visual digital objects organized according to predetermined time periods and providing thumbnail representations thereof; selecting a portion of the histogram timeline for viewing such thumbnail representations of visual digital objects corresponding to such selected portion; and determining if one or more of the viewed such thumbnail representations is of interest and then viewing the corresponding digital visual object(s).

17 Claims, 13 Drawing Sheets

USING DIGITAL OBJECTS ORGANIZED ACCORDING TO A HISTOGRAM TIMELINE

CROSS REFERENCE TO RELATED APPLICATIONS

Reference is made to commonly assigned U.S. patent application Ser. No. 09/742,028 filed Dec. 20, 2000, entitled "Timeline-Based Graphical User Interface for Efficient Image Database Browsing and Retrieval" by Elizabeth Rosenzweig et al.; commonly assigned U.S. patent application Ser. No. 09/163,618 filed Sep. 30, 1998, entitled "A Method for Automatically Classifying Images Into Events" by Alexander C. Loui et al.; and commonly assigned U.S. patent application Ser. No. 09/197,363 filed Nov. 20, 1998, entitled "A Method for Automatically Comparing Content of Images for Classification Into Events" by Alexander C. Loui et al., the disclosures of which are incorporated herein by reference.

FIELD OF THE INVENTION

The present invention relates to an effective method of organizing digital objects and for facilitating the display or processing of desired objects.

BACKGROUND OF THE INVENTION

Digital imaging devices are being used with increasing frequency to record digital still images and digital audio/video sequences. Digital multimedia content from other sources is also proliferating, such as digitized consumer snapshots, digitized home video, digitally scanned graphics, digitized music, and other audio recording. With the potential for vast numbers of such multimedia objects to be generated and stored by individuals, the problem of representing a collection of such objects to a user for retrieval and organization becomes important. Typically, a digital camera user takes a plurality of digital images or audio/video sequences that are stored on a removable memory card. These multimedia objects can be transferred from the memory card and stored, for example, on a hard drive or other non-volatile memory associated with the user's computer. Alternatively, digital multimedia objects can be transferred over the internet to a web site for storage, sharing, printing, and other purposes.

Over time, a user can collect hundreds, or perhaps thousands, of multimedia objects, which are records of events at various points in time. As the number of such objects in a particular database grows, traditional methods of displaying them to a user such as in hierarchical file structures or simple "contact sheets" of image thumbnails become ineffective.

SUMMARY OF THE INVENTION

It is an object of the present invention to permit a user to facilitate access to desired digital objects from a database.

It is another object of the present invention to provide an effective method for organizing representations of digital multimedia objects to facilitate the selection of desired digital multimedia objects.

These objects are achieved by a method for organizing visual digital objects and for selecting one or more of such visual digital objects for viewing, comprising the steps of:

a) developing a histogram timeline which identifies a number of visual digital objects organized according to predetermined time periods and providing thumbnail representations thereof;

b) selecting a portion of the histogram timeline for viewing such thumbnail representations of visual digital objects corresponding to such selected portion; and c) determining if one or more of the viewed such thumbnail representations is of interest and then viewing the corresponding digital visual object(s).

These digital objects can be digital still images, digital audio files, digital video segments, graphics files, or related multimedia data. It is an important feature of the present invention that the use of a histogram timeline permits effective interaction with selecting either single media or multimedia digital objects in a database.

ADVANTAGES

It is an advantage of the present invention that the generation of a histogram timeline facilitates the representation of a collection of multimedia objects to a user and to facilitate the interaction and selection of the objects.

DETAILED DESCRIPTION OF THE INVENTION

The present invention provides an effective method of representing a collection of multimedia or single media objects to a user and to facilitating the interaction with and selection of such objects. These objects are typically visual digital objects such as, for example, still image files, MPEG-1 motion sequences with sound, or digital audio objects such as "WAV" files, that can be collected by a user and distributed over a variety of media and storage locations.

The entire collection of these objects, or even some subset, can be so large as to make searching, annotating, processing, or viewing difficult.

With the notable exception of recorded music, the majority of these objects are, to the user, strongly associated with a date or event. This date is typically, though not necessarily, the date of the origination of the object data, as is the case with personal memories such as still images, sound recordings, and home video sequences.

Since each of these objects is typically associated with a date, it is natural to organize them according to dates. A timeline is a well known method for showing events in chronological order, and representations of objects, such as thumbnail images, can be arranged on a timeline for display. However, in large collections more than one object can be associated with a particular date, and the collection can cover a long time span. In such cases, it is impractical to arrange thumbnails of all objects along the timeline. In accordance with the present invention, a more effective representation is to build a histogram timeline in which the number of objects associated with each date, or time interval, are represented in a graphical form such as a bar chart. More particularly, as will be seen, the histogram timeline represents visual digital objects organized according to predetermined time periods. Thereafter, thumbnail representations are produced after a selection from the histogram timeline.

Figure 1:
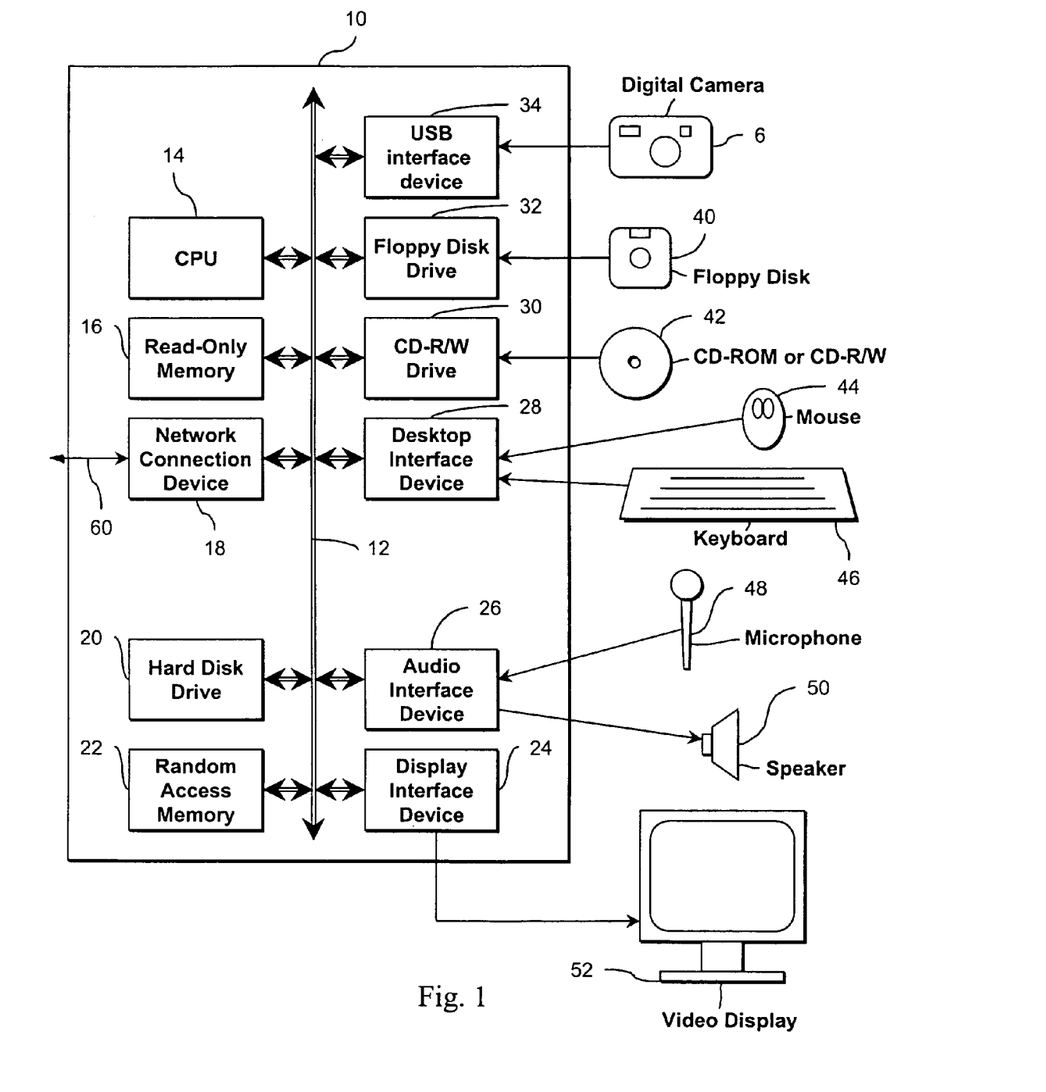
FIG. 1 is a block diagram of a system for practicing the present invention.

As shown in FIG. 1, a system for practicing the present invention includes a home computer 10, which can be, for example, a Dell Dimension L. The home computer 10 includes a CPU 14, which communicates with other devices over a bus 12. The CPU 14 executes software stored on a hard disk drive 20, for example, the well known Windows 98 operating system software provided by Microsoft Corp. of Redmond, Wash. A video display device 52 is coupled to the CPU 14 via a display interface device 24. The mouse 44 and keyboard 46 are coupled to the CPU 14 via a desktop interface device 28. The home computer 10 also contains a CD-R/W drive 30 to read various CD media and write to CD-R or CD-RW writable media 42. A floppy disk drive 32 is also included to read from and write to floppy disks 40. An audio interface device 26 connected to bus 12 permits audio data from, for example, a digital sound file stored on hard disk drive 20, to be converted to analog audio signals suitable for speaker 50. The audio interface device 26 also converts analog audio signals from microphone 48 into digital data suitable for storage in, for example, the hard disk drive 20. In addition, the home computer 10 is connected to an external network 60 via a network connection device 18. A digital camera 6 can be connected to the home computer 10 through, for example, the USB interface device 34 to transfer still images, audio/video, and sound files from the camera to the hard disk drive 20 and vice-versa.

A collection of digital multimedia or single-media objects (digital images) can reside exclusively on the hard disk drive 20, compact disk 42, or at a remote storage device such as a web server accessible via the network 60. The collection can be distributed across any or all of these as well.

To represent the collection, first all of the digital multimedia objects must be associated together as a database. It will be understood that these digital multimedia objects can be digital still images, such as those produced by digital cameras; audio data, such as digitized music or voice annotation files in the "WAV" or "MP3" audio file format; and digital video segments with or without sound, such as MPEG-1 or MPEG-4 video. Digital multimedia objects also include files produced by graphic software, for example the well known Visio graphics software product, and files representing text documents, such as those produced by the well known Microsoft Word product. A database of digital multimedia objects can comprise only one type of object or any combination.

Figure 2:
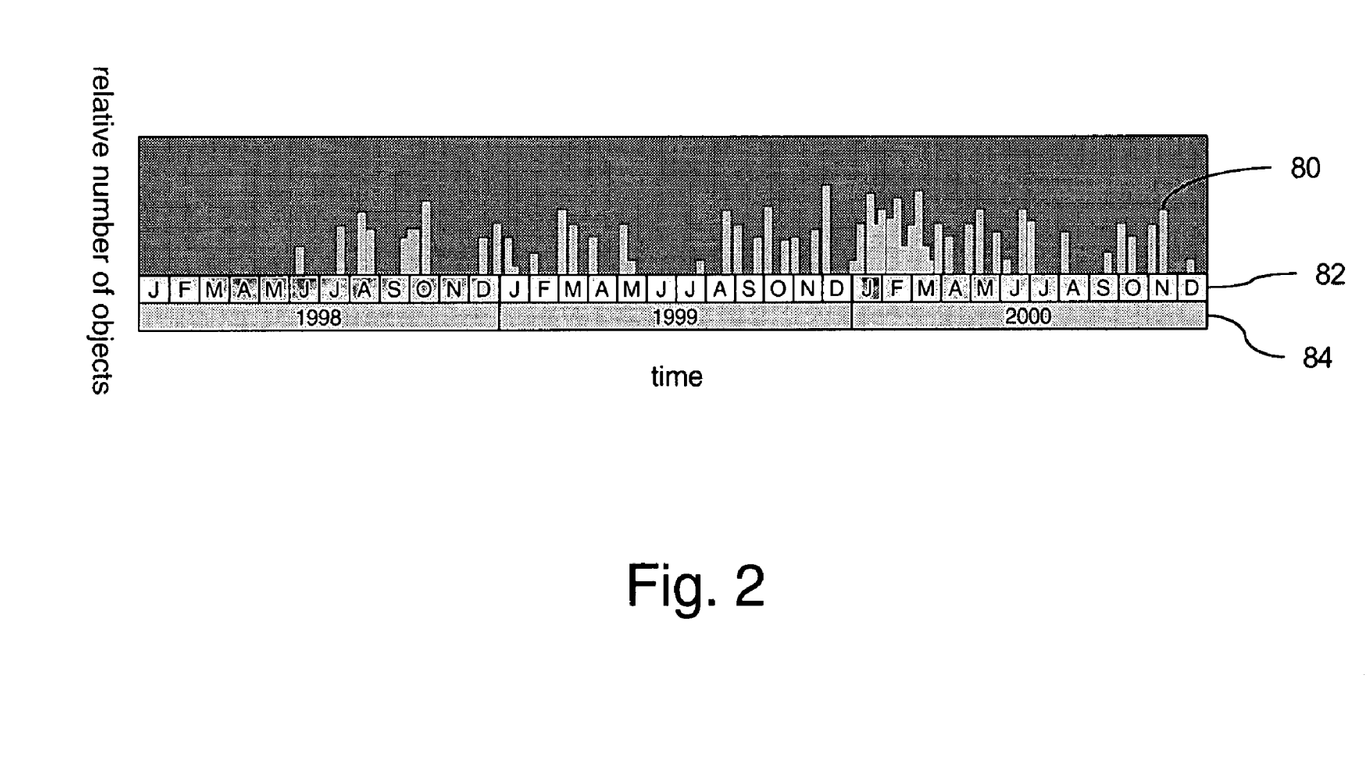
FIG. 2 is a histogram timeline diagram made in accordance with the present invention.

Once a collection of digital multimedia objects are associated together to form a database, they can be represented to the user in accordance with the present invention. FIG. 2 shows an example of a histogram timeline. In this example, the horizontal axis is enumerated in units of time and the vertical axis is enumerated in the number of digital multimedia objects. Alternatively, the vertical axis can be enumerated in the relative number of digital multimedia objects. The length of graphical bar 80 represents the relative number of objects in the chosen database in a given date bin on timelines 82 and 84. A date bin is the interval of time over which objects associated with a date in that interval are counted together. A date bin can have any duration, but would typically be no less than one day. Larger date bins might be constructed if the display area for the histogram was small or the length of the timeline was so large that short date bins could not be displayed adequately. In this example, time scale 82 is composed of month increments and time scale 84 is composed of year increments, though a single time scale is also possible.

Figure 3A:
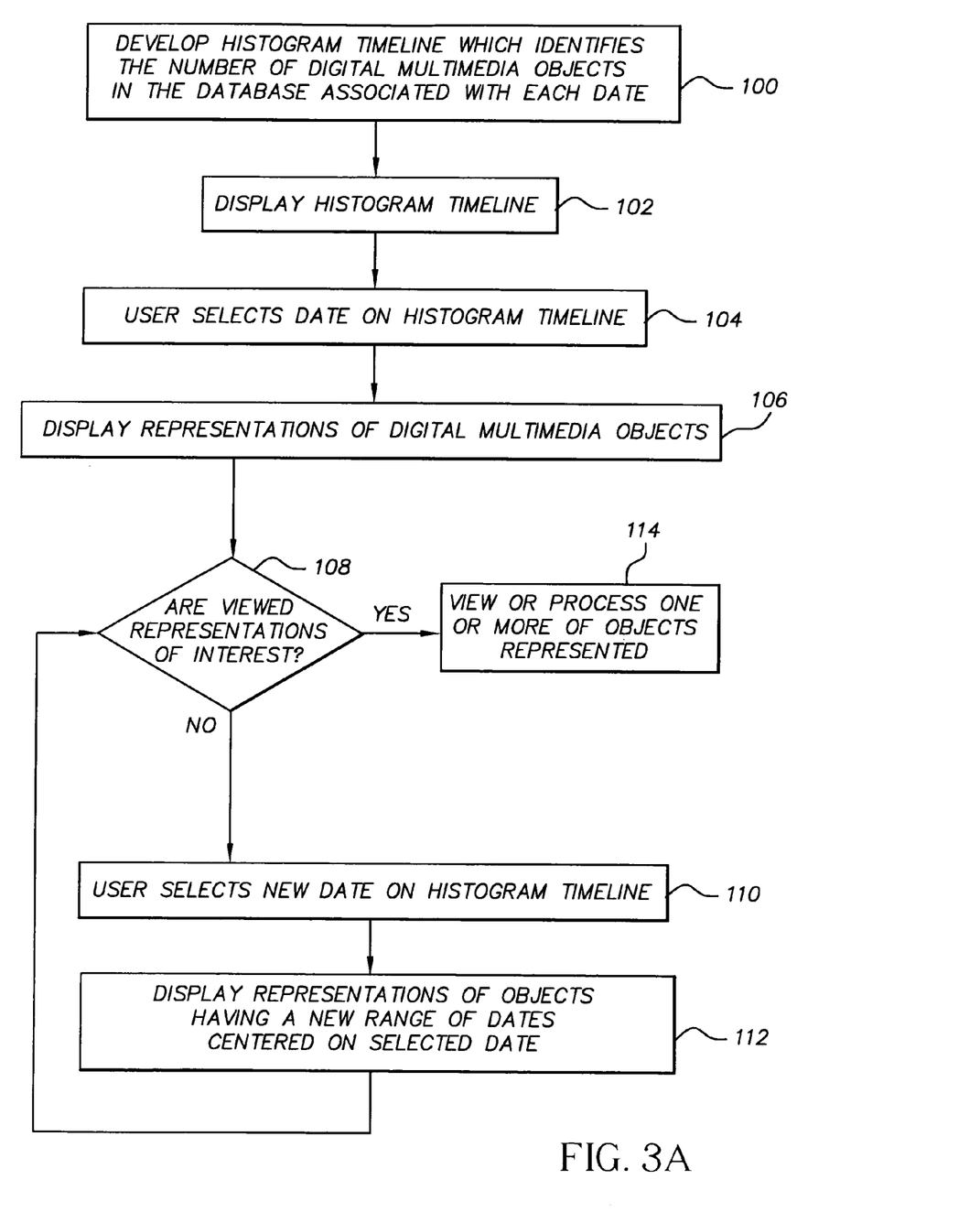
FIG. 3A is a flow diagram showing how a histogram timeline, such as in FIG. 2, can be made and further describing how to select a portion of the histogram timeline for viewing such thumbnail representations of such objects corresponding to such selected portion.

FIG. 3A is a flow diagram that illustrates the generation of the histogram timeline and the interactive steps for practicing the present invention. In step 100, the histogram timeline is formed by counting the number of objects in the database that are associated with each date. The result, internally, is an array of ordered pairs of numbers. One number in the pair represents a given date, and the associated number represents the number of objects associated with the date.

Figure 6A:
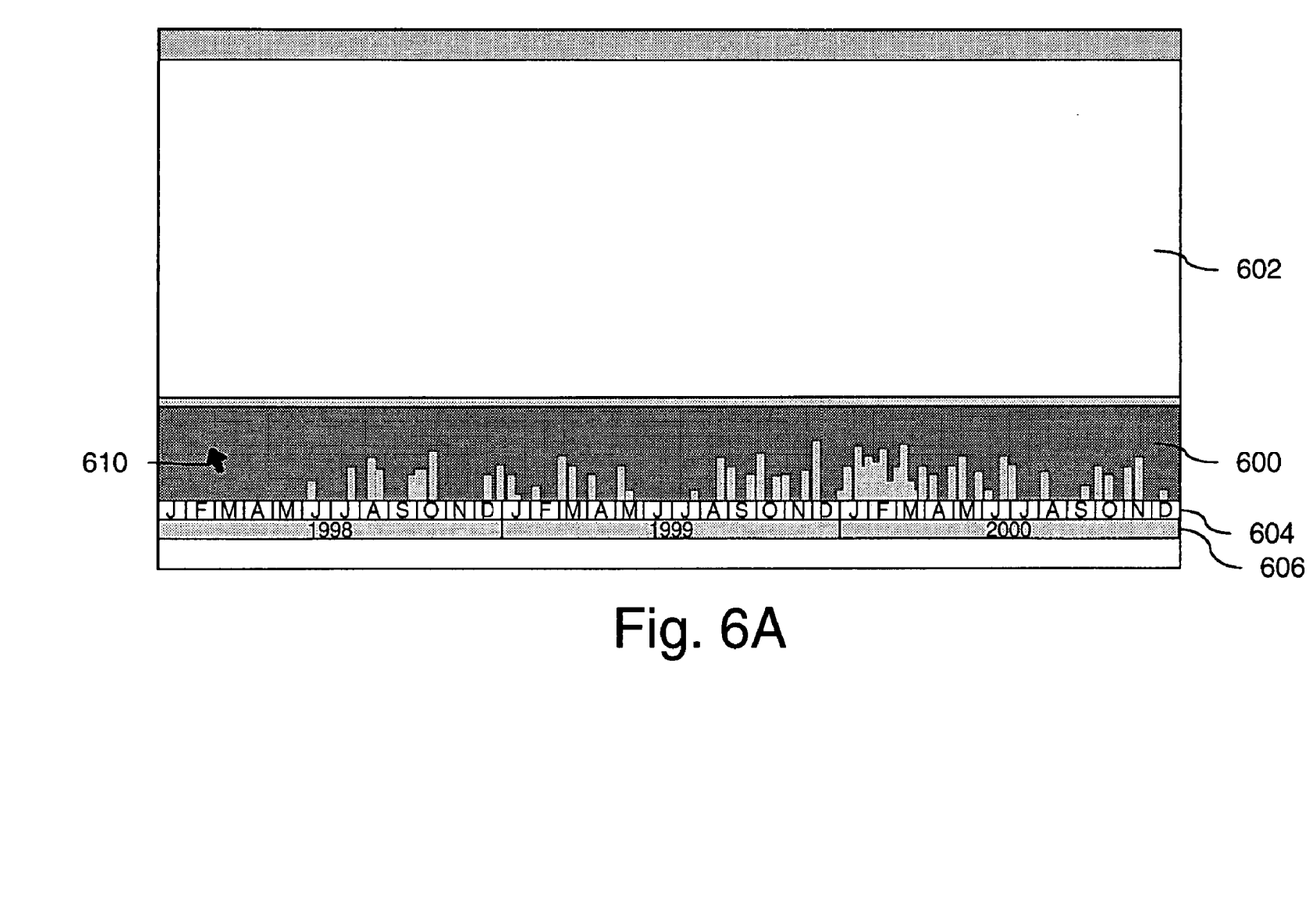
FIG. 6A is a depiction of a histogram timeline on a display screen in an initial state.

In step 102, the histogram timeline is displayed graphically to the user, as shown in FIG. 6A, with a predetermined range of dates (timeline) based, for example, on the earliest to latest dates associated with all of the objects in the chosen database. Region 600 denotes the area in which the timeline is located, and 604 and 606 are the fine and coarse timeline scales, respectively. Region 602 is a separate viewable area where iconic or thumbnail representations of digital multimedia objects can be displayed to the user. The user may also select one or more of the representations to view, listen to, and/or process. Pointer 610 is a selection device such as a mouse, joystick, or eye movement tracking apparatus.

Figure 6B:
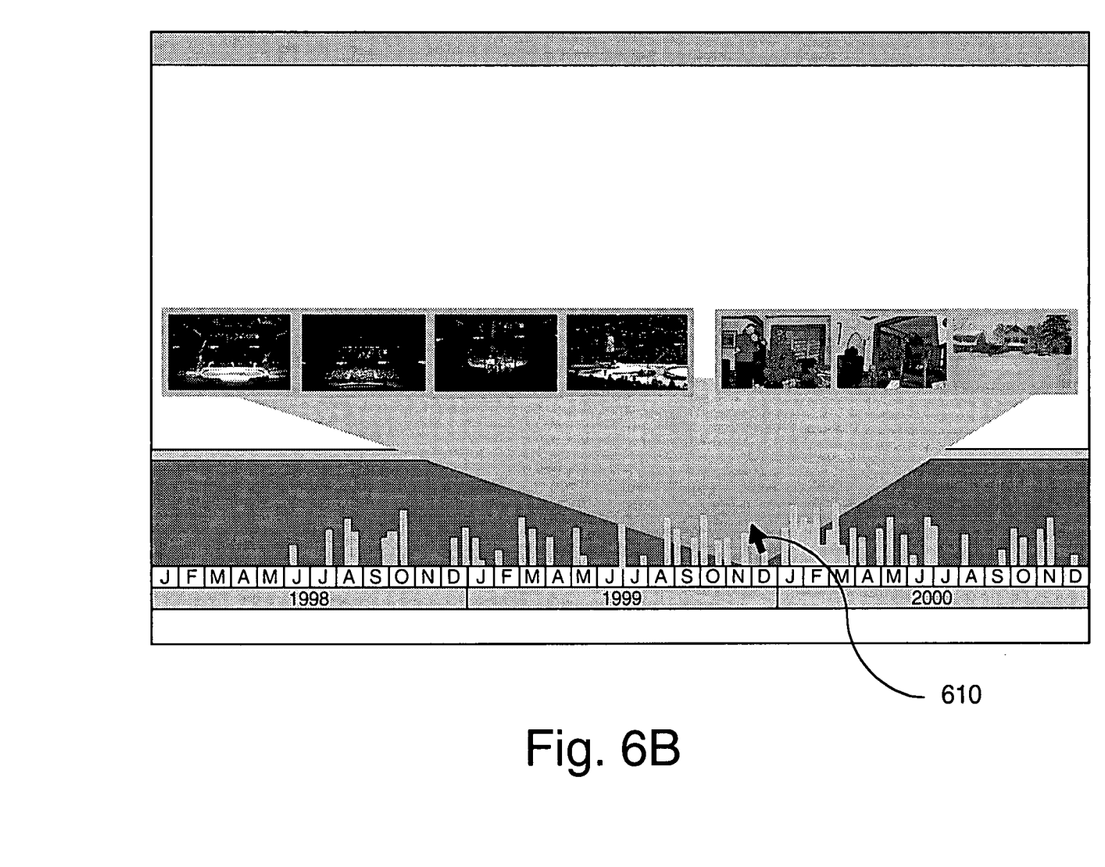
FIG. 6B is a depiction of a histogram timeline and thumbnail representations on a display screen after a portion of the timeline has been selected.

Referring again to FIG. 3A, in step 104 the user selects a date of interest on the histogram timeline. This is depicted in FIG. 6B, where the user selects a date by moving the mouse to move a graphical pointer 610 to a particular histogram bar on the timeline and "clicking" the mouse button. If the date bins were longer than one day, then "clicking" on a histogram bar would select the range of dates included in the date bin interval. After selection of the date, thumbnail or iconic representations appear, corresponding to the objects associated with the chosen date, according to step 106 in FIG. 3A. Additionally, the thumbnail and iconic representations displayed, can be grouped according to the events to which they relate, as described in commonly assigned U.S. patent application Ser. No. 09/163,618 filed Sep. 30, 1998, entitled "A Method for Automatically Classifying Images Into Events" by Alexander C. Loui et al., and commonly assigned U.S. patent application Ser. No. 09/197,363 filed Nov. 20, 1998, entitled "A Method for Automatically Comparing Content of Images for Classification Into Events" by Alexander C. Loui et al., the disclosures of which are incorporated herein by reference.

In step 108, the user decides if the representations displayed are of interest. If not, the user can then select a new date on the histogram timeline, as shown in step 110. In step 112, new iconic or thumbnail representations are displayed corresponding to objects associated with the new date. Alternatively, other ways can be used to access thumbnail or iconic representations extending just outside of the range displayed to the user. For example, a scroll bar oriented below the representations could be used to scroll forward and backward in time, with the representations and the timeline changing in response. In the practice of the present invention, it will be understood that "dragging" a thumbnail to a new viewing position can be accomplished by selecting it and then moving the pointer. As the thumbnail is dragged, thumbnail representations in the direction of motion are "pushed" off the screen, and new thumbnail representations are "pulled" into the screen from the opposite side.

Referring again to FIG. 3A, if one or more of the thumbnail representations is of interest, the user can then move on to view or process one of the objects represented as shown in step 114. Processing can entail, for example, invoking an image viewer for viewing an image at a higher resolution, invoking an image editor to edit a still image, invoking an audio player for listening to audio data, or invoking a video player to view a video sequence. Processing can also entail the addition of audio, graphical, and text annotation to an object, transferring objects to another database or collection, or some other function based on the digital multimedia object type and user's desire.

Figure 3B:
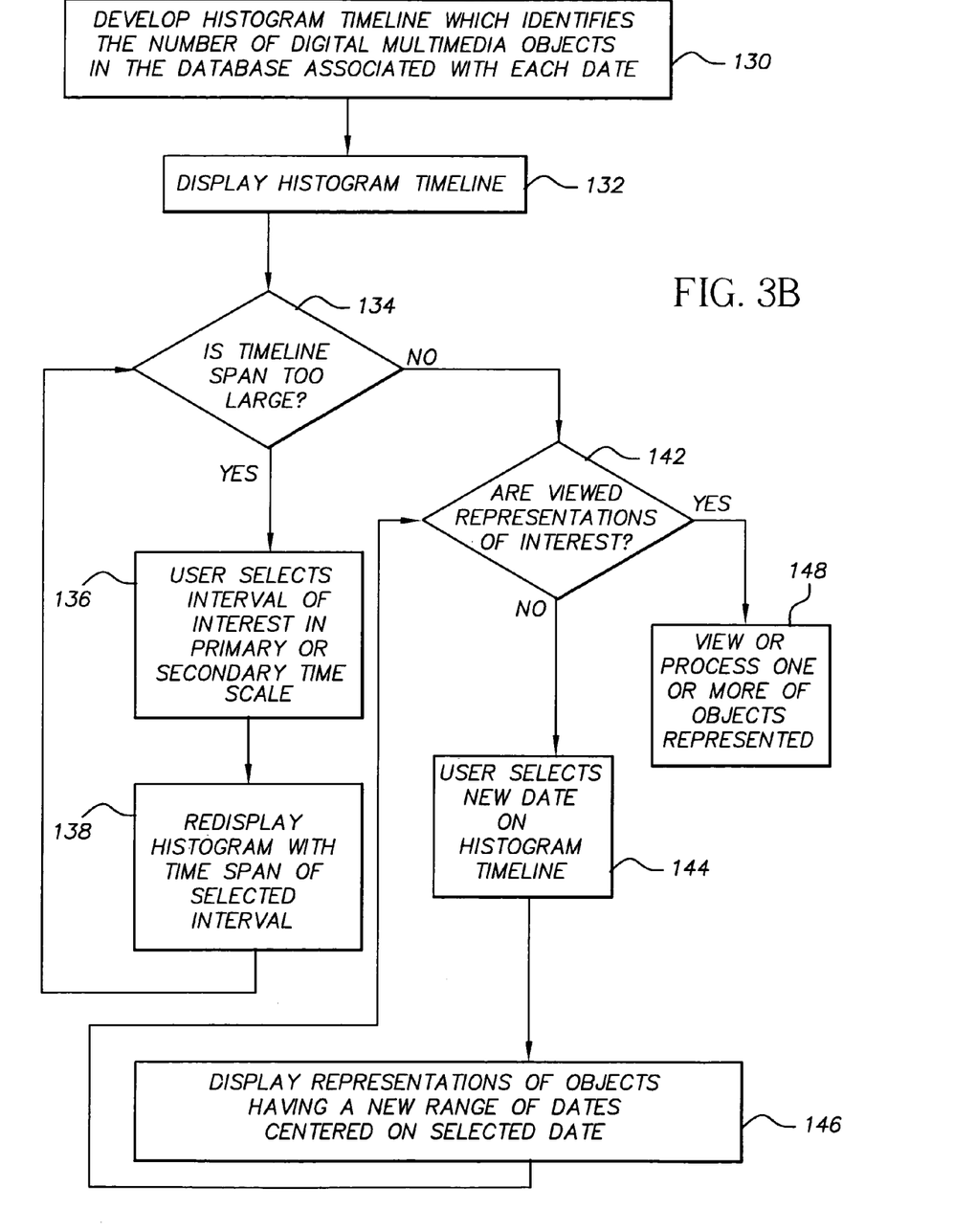
FIG. 3B is a flow diagram showing the determination of the desired span of the histogram timeline and showing how to select a portion of the histogram timeline for viewing such thumbnail representations of such objects corresponding to such selected portion.

FIG. 3B is a flow diagram that illustrates the generation of a histogram timeline and further steps involved in interacting with it. The histogram timeline is formed as shown in step 130 by counting the number of objects in the database that are associated with each date. The result, internally, is an array of ordered pairs. One number in the pair represents a given date, and the associated number represents the number of objects associated with the date.

In step 132, the histogram timeline is displayed graphically to the user, as shown in FIG. 6A, with a predetermined range of dates (timeline) based, for example, on the earliest to latest dates associated with all of the objects in the chosen database. The histogram is displayed with two time scales; a primary time scale having coarse intervals, such as whole years, and an adjacent secondary time scale having finer intervals such as whole months.

Figure 6C:
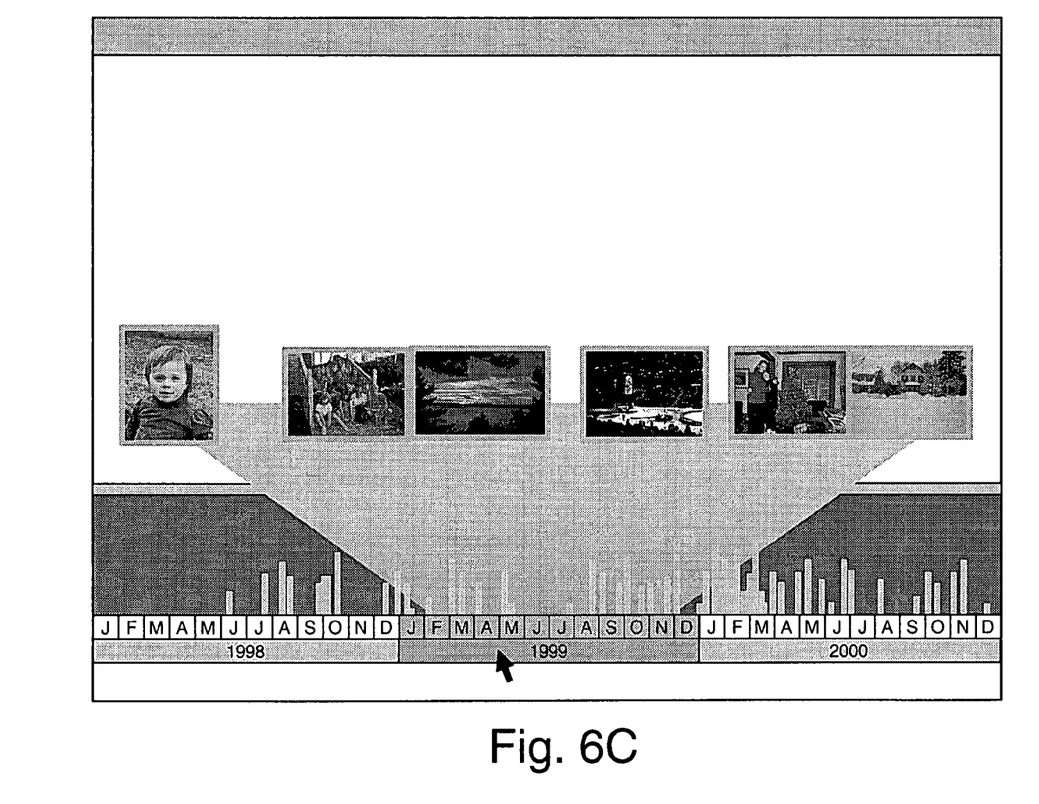
FIG. 6C is a depiction of a histogram timeline and thumbnail representations on a display screen during selection of a shortened time scale.
Figure 6D:
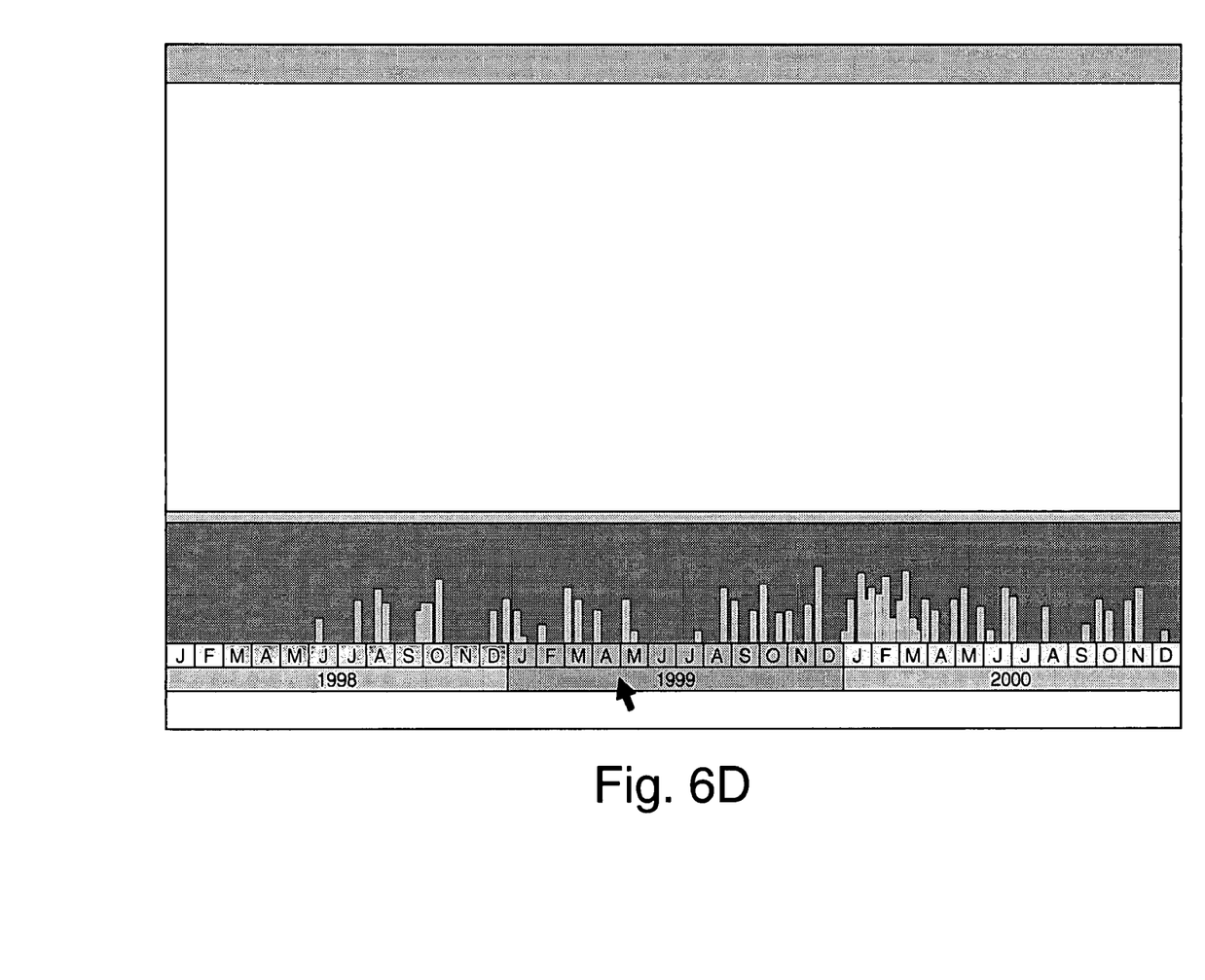
FIG. 6D is a depiction of a histogram timeline without thumbnail representations on a display screen during selection of a shortened time scale.

In step 134, the user determines whether or not the timeline span is too large to work with effectively. If so, then in step 136 the user selects an interval either on the coarse primary time scale or the finer secondary time scale. FIG. 6C illustrates selection of the year 1999 on the coarse time scale, with representations of randomly selected objects from that year appearing while the date is selected by, for example, holding down a mouse button. In addition, the region denoting the year 1999 is highlighted to suggest selection. The appearance of the representations can persist as long the mouse button is held down by the user. Alternatively, if the display of representations is slow relative to the amount of time the user wishes to hold down the mouse button, only the region denoting the year 1999 is highlighted without displaying any representations, as illustrated in FIG. 6D.

Figure 6E:
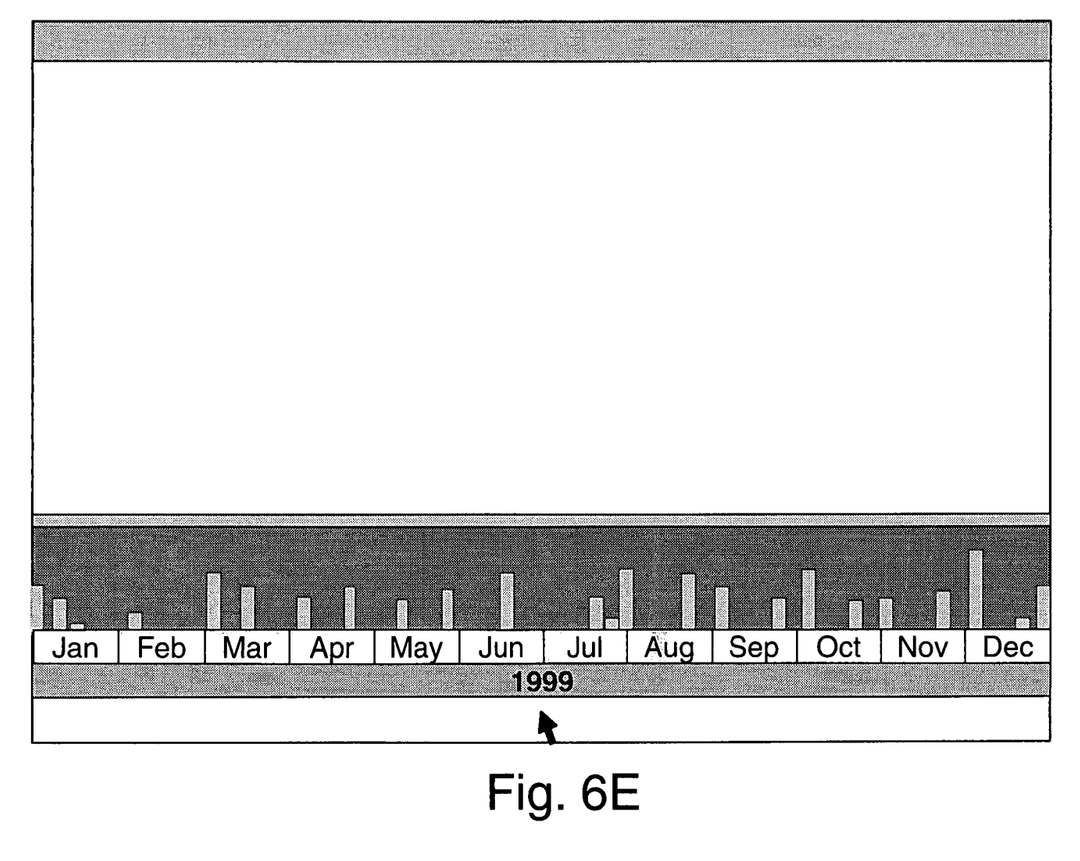
FIG. 6E is a depiction of a histogram timeline on a display screen after selection of a shortened time scale.
Figure 6F:
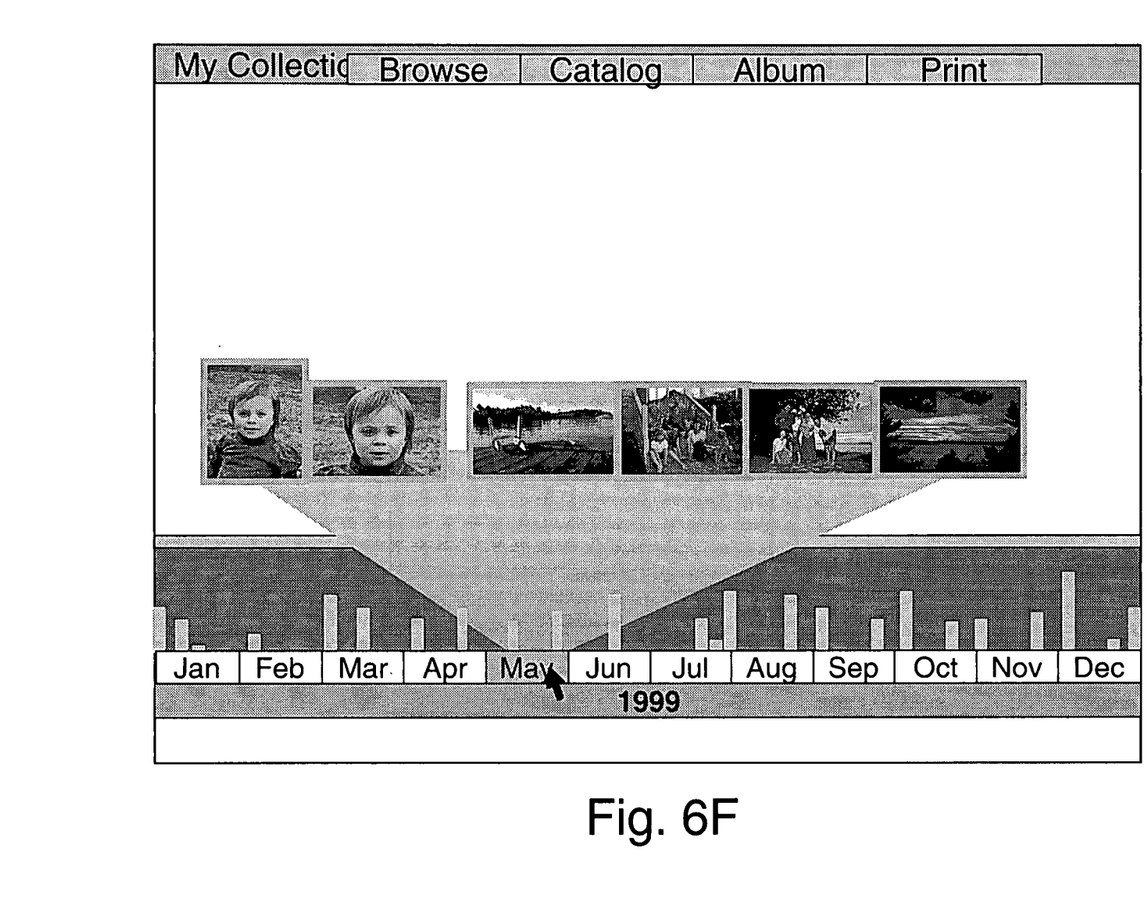
FIG. 6F is a depiction of a histogram timeline and thumbnail representations on a display screen during further selection of a shortened time scale.
Figure 6G:
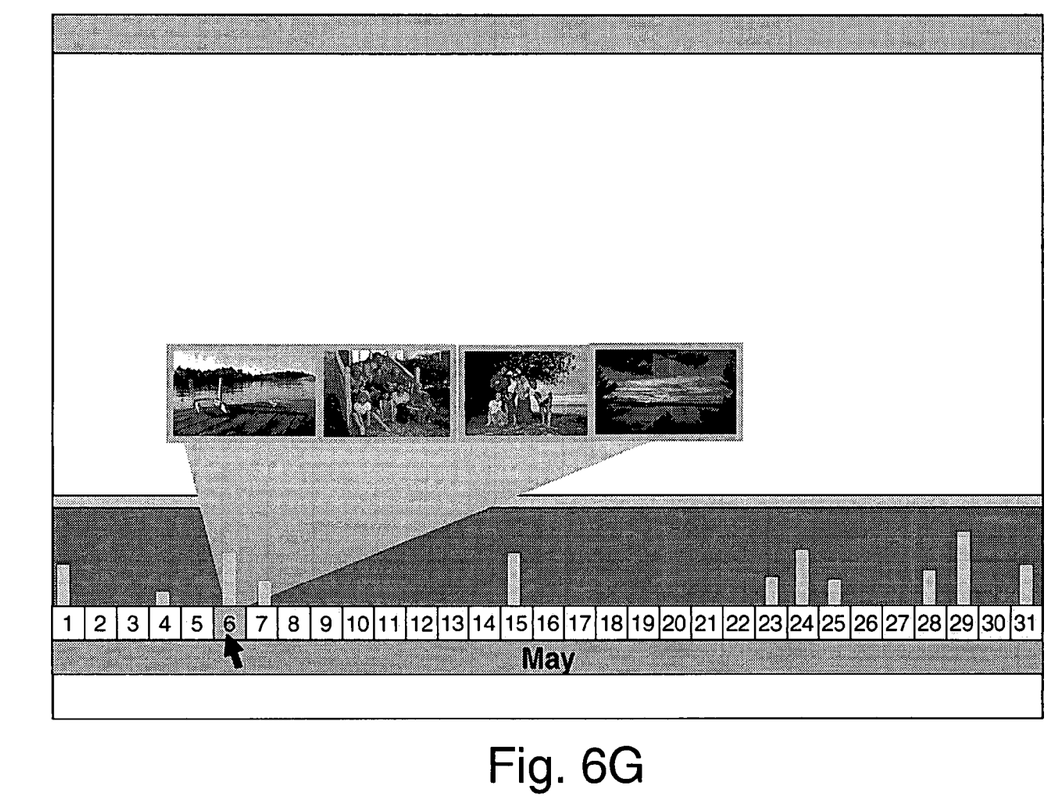
FIG. 6G is a depiction of a histogram timeline and thumbnail representations on a display screen during further selection of a shortened time scale.

Upon release of the mouse button by the user, the histogram timeline is redisplayed according step 138 of FIG. 3B, with the earliest and latest dates of the histogram timeline changed to correspond with span of the interval selected, as illustrated in FIG. 6E. If the process is repeated, then the primary and secondary timeline intervals are changed as appropriate. For example, if the user selects the month of May, 1999 as shown in FIG. 6F, then new thumbnail or iconic representations corresponding to objects associated with May, 1999 are displayed while the mouse button is held down by the user. When the user releases the mouse button, histogram timeline is redisplayed such that the earliest and latest dates of the histogram timeline correspond with the month of May, 1999. The coarse intervals are then months and the fine intervals days as illustrated in FIG. 6G. Selection of any day in the month, also shown in FIG. 6G, results in thumbnail or iconic representations to be displayed, corresponding to digital multimedia objects associated with that day.

At any point in the process, as shown in step 144 of FIG. 3B, the user can select a date by selecting a bar on any of the histogram timeline representations, as illustrated earlier in FIG. 6B. Representations of digital multimedia objects corresponding to the date are then displayed as shown in step 146. If the user was interested in a particular thumbnail representation according to step 142, the user could then view or otherwise interact with the actual object or set of objects by, for example, "double clicking" on a representation, as shown in step 148.

Figure 4:
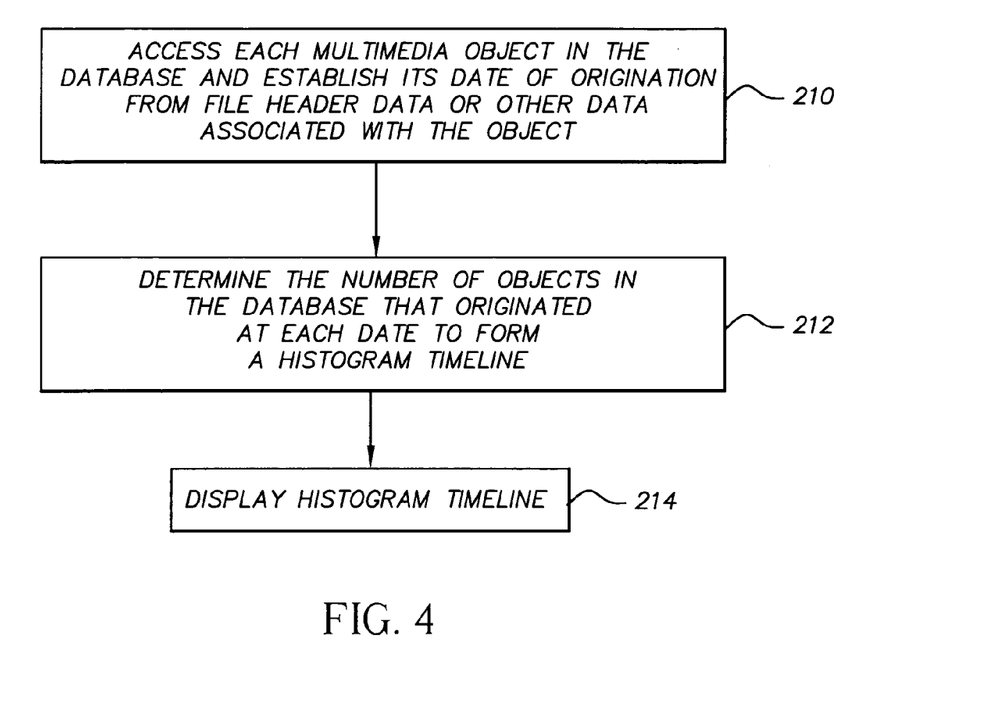
FIG. 4 is a flow diagram showing, in more detail, how a histogram timeline can be made.

FIG. 4 is a flow diagram that describes in more detail how a histogram timeline in accordance with the present invention can be generated. In step 210, each multimedia object in the database is accessed and a date of origination is established from either header data, such as capture date from a digital camera, or from some other data associated with the object. For example, in the absence of reliable header information, the object's file origination date could be used. Alternatively, user-entered annotation could be searched. In step 212, the number of objects associated with each date are determined, to form a histogram timeline. Finally, in step 214, the histogram timeline is displayed to the user.

Figure 5:
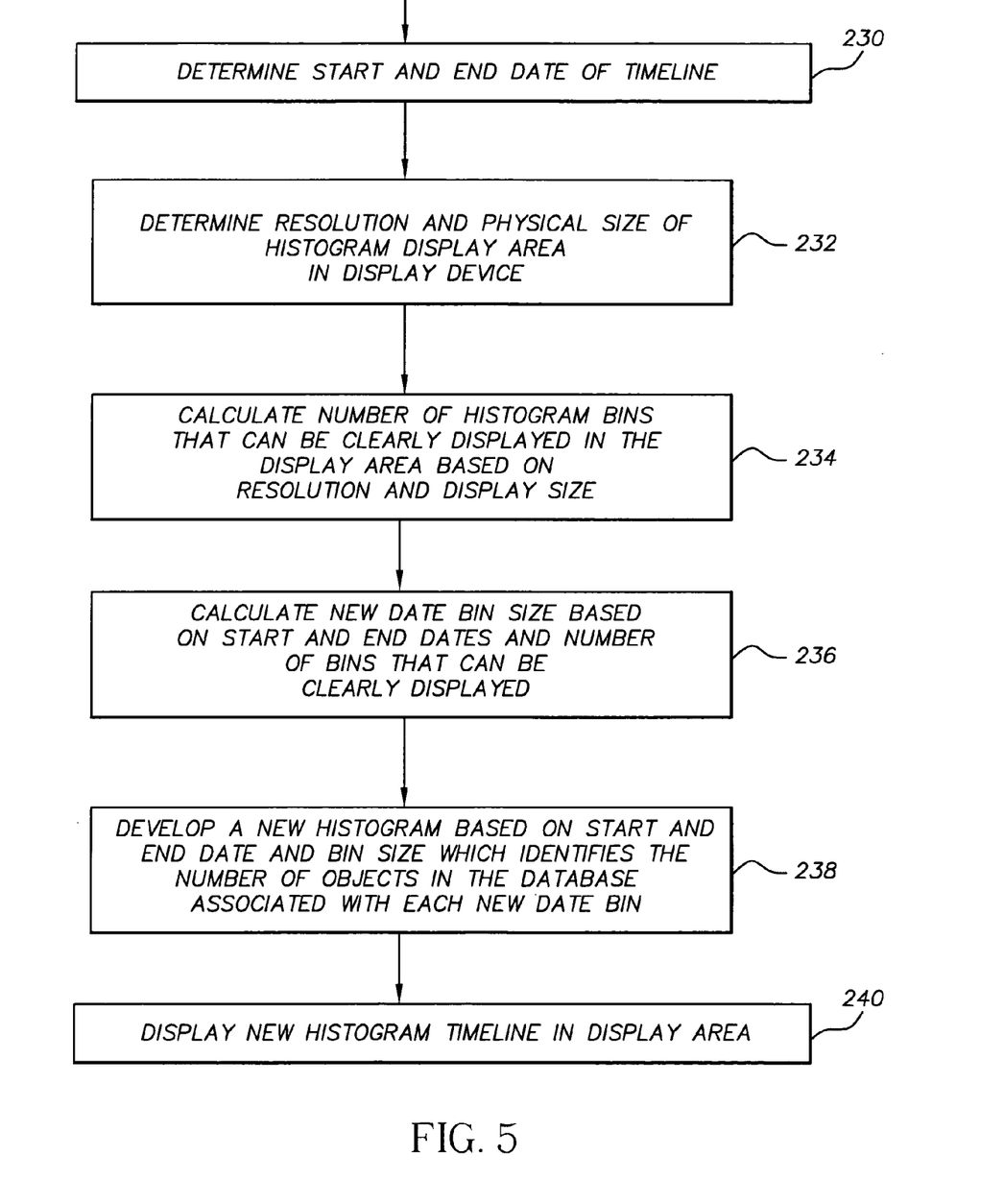
FIG. 5 is a flow diagram showing how the histogram timeline can be made responsive to the resolution and size of the display device.

FIG. 5 depicts a flow diagram showing how the histogram timeline can be made responsive to the resolution and size of the display device. This can be important if the histogram is to be displayed on a portable device such as a cellular phone or personal digital assistant where display resolution and size are limited. It is also useful on any display if the time span of the histogram timeline is very long and individual date bins cannot be adequately displayed.

Once the histogram timeline is generated, the start and end dates of the histogram timeline to be displayed are determined as shown in step 230. In step 232, the resolution and physical size of the display area are determined. For example, resolution could be expressed as the number of horizontal and vertical pixels constituting the display area, and the size of the display area could be expressed as horizontal and vertical dimensions in millimeters.

Next, in step 234, the number of histogram bins that can be clearly displayed is calculated. The number of histogram bins that can be clearly displayed can, for example, include additional factors such as a human visual system model.

In step 236, based on the number of histogram bins that can be clearly displayed and the desired start and end date of the histogram timeline, new date bin sizes are calculated. In step 238, a new histogram timeline is generated with the modified bin sizes. Finally, in step 240, the modified histogram timeline with more visible bin size is displayed.

A computer program product can include one or more storage medium, for example; magnetic storage media such as magnetic disk (such as a floppy disk) or magnetic tape; optical storage media such as optical disk, optical tape, or machine-readable bar code; solid-state electronic storage devices such as random access memory (RAM), or read-only memory (ROM); or any other physical device or media employed to store a computer program having instructions for practicing a method according to the present invention.

The invention has been described in detail with particular reference to certain preferred embodiments thereof, but it will be understood that variations and modifications can be effected within the spirit and scope of the invention.

PARTS LIST

| | |
|---|---|
| 6 | digital camera |
| 10 | home computer |
| 12 | data bus |
| 14 | CPU |
| 16 | read-only memory |
| 18 | network connection device |
| 20 | hard disk drive |
| 22 | random access memory |
| 24 | display interface device |
| 26 | audio interface device |
| 28 | desktop interface device |
| 30 | CD-R/W drive |
| 32 | floppy disk drive |
| 34 | USB interface device |
| 40 | floppy disk |
| 42 | CD-RW writable media |
| 44 | mouse |
| 46 | keyboard |
| 48 | microphone |
| 50 | speaker |
| 52 | video display device |
| 60 | network |
| 80 | graphical bar |
| 82 | timeline scale |
| 84 | timeline scale |
| 100 | block |
| 102 | block |
| 104 | block |
| 106 | block |
| 108 | block |
| 110 | block |
| 112 | block |
| 114 | block |
| 130 | block |
| 132 | block |
| 134 | block |
| 136 | block |
| 138 | block |
| 142 | block |
| 144 | block |
| 146 | block |
| 148 | block |
| 210 | block |
| 212 | block |
| 214 | block |
| 230 | block |
| 232 | block |
| 234 | block |
| 236 | block |
| 238 | block |
| 240 | block |
| 600 | timeline location |
| 602 | viewable area |
| 604 | timeline scale |
| 606 | timeline scale |
| 610 | pointer |

What is claimed is:

1. A method for organizing visual digital objects and for selecting one or more of such visual digital objects for viewing, comprising the steps of:
    a) developing a histogram timeline which identifies a number of visual digital objects organized according to predetermined time periods and providing thumbnail representations thereof;
    b) selecting a portion of the histogram timeline for viewing such thumbnail representations of visual digital objects corresponding to such selected portion; and
    c) determining if one or more of the viewed such thumbnail representations is of interest and then viewing the corresponding digital visual object(s).

2. A computer storage medium having instructions stored therein for causing a computer to perform the method of claim 1.

3. A method for organizing digital multimedia objects and for selecting one or more digital multimedia objects for viewing or processing, comprising the steps of:
    a) developing a histogram timeline which identifies a number of digital multimedia objects organized according to predetermined time periods and providing representations thereof;
    b) selecting a portion of the histogram timeline for viewing representations of digital multimedia objects corresponding to such selected portion; and
    c) determining if one or more of the viewed representations is of interest and then viewing or processing the corresponding digital multimedia object(s).

4. A method for organizing digital multimedia objects including visual and audio and for selecting one or more of digital multimedia objects for viewing or listening, comprising the steps of:
    a) developing a histogram timeline which identifies a number of such objects organized according to predetermined time periods and providing thumbnail or iconic representations of the visual objects and text or iconic representations of the audio objects;
    b) selecting a portion of the histogram timeline for viewing representations of such objects corresponding to such selected portion; and
    c) determining if one or more of the viewed representations is of interest and then viewing or listening to the corresponding digital multimedia object(s).

5. The method of claim 4 wherein the representations correspond to a combination of visual and audio representations.

6. The method of claim 5 wherein the visual and audio objects include still and motion images.

7. A method for organizing digital multimedia objects and for selecting one or more of such objects for viewing or processing, comprising the steps of:
    a) developing a histogram timeline which identifies a number of digital multimedia objects organized according to predetermined time periods and providing representations thereof;
    b) selecting a portion of the histogram timeline for viewing representations of digital multimedia objects corresponding to such selected portion; and
    c) repeating step b) until it is determined which representations are of interest and then viewing or processing the corresponding digital multimedia objects.

8. The method of claim 7 wherein the histogram timeline is constructed by:
   i) accessing a plurality of digital multimedia objects stored together or in distributed fashion and forming a database;
   ii) establishing the date of origination of each digital multimedia object from file header data or object metadata; and
   iii) determining the number of digital multimedia objects in the database that originated at each date to form the histogram timeline.

9. The method of claim 7 further including:
   iv) rendering the histogram timeline so the horizontal axis being time and the vertical axis is the number of digital multimedia objects, with the timeline length running from the earliest to the latest dates of the digital multimedia objects in the database and the duration (width) of the histogram timeline bins being responsive to the resolution and size of the display.

10. The method of claim 7 further including the step of changing the histogram timeline to vary the earliest to latest dates.

11. The method of claim 7 wherein the representations are provided in a separate viewable area than the histogram timeline and include the thumbnail images and icons of the digital multimedia objects have a displayed date and time of origination.

12. The method of claim 7 wherein the thumbnail and iconic representations are grouped according to the events to which they relate.

13. A viewable histogram timeline, comprising:
   a) the histogram timeline which identifies a number of visual or multimedia digital objects organized according to predetermined time periods; and
   b) representations corresponding to portions of the histogram timeline which are actuable by a viewer selecting such portions to view such representations.

14. The viewable histogram timeline of claim 13 wherein the timeline is arranged in vertical and horizontal axes so that the horizontal axis is time and the vertical axis is the number of objects, with the timeline length running from the earliest to the latest dates of the objects in a database.

15. The viewable histogram timeline of claim 13 wherein the representations are thumbnail images.

16. The viewable histogram timeline of claim 13 wherein the representations are provided in a separate viewable area than the histogram timeline and include the thumbnail images and icons of the digital multimedia objects have a displayed date and time of origination.

17. The viewable histogram timeline of claim 13 wherein the thumbnail and iconic representations are grouped according to the events to which they relate.

* * * * *